Oct. 13, 1964     H. G. LEUPOLD     3,152,859
PEN ARM FOR RECORDING INSTRUMENT
Original Filed April 4, 1960
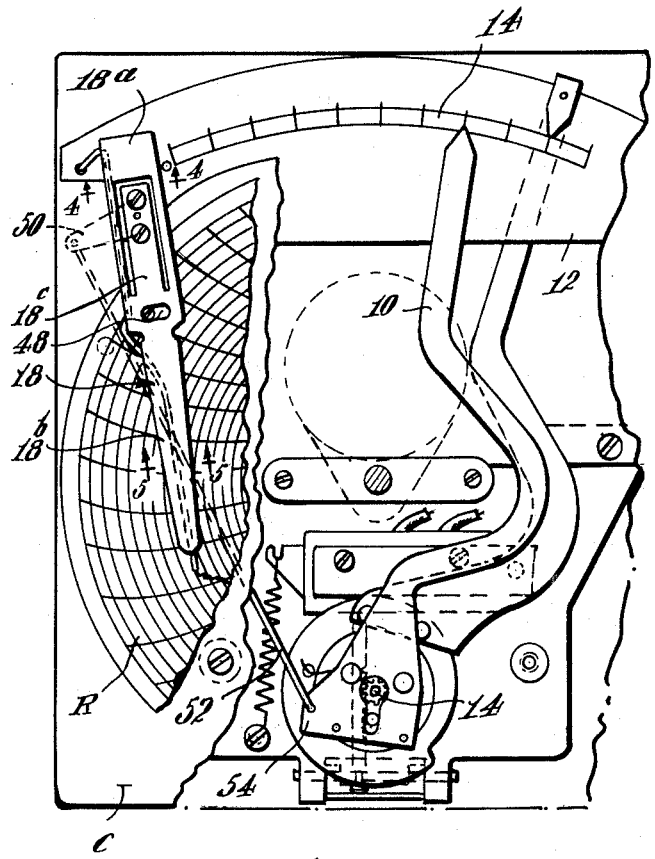
Fig. 1
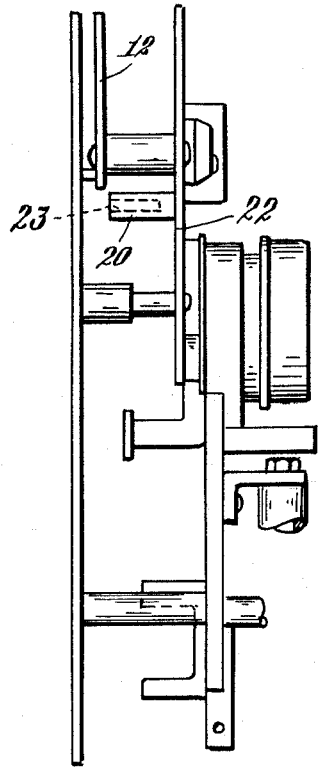
Fig. 2
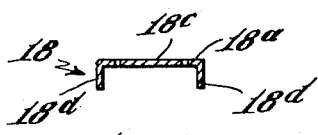
Fig. 4
Fig. 5
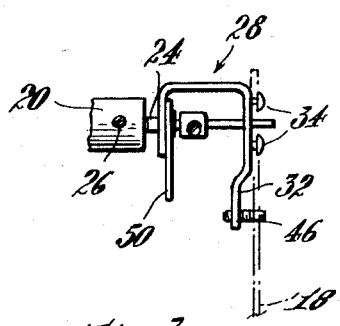
Fig. 3
INVENTOR.
Henry G. Leupold
BY Roberts, Cushman & Grover
ATT'YS

3,152,859
PEN ARM FOR RECORDING INSTRUMENT
Henry G. Leupold, Arlington, Mass., assignor to United Electric Controls Company, Watertown, Mass., a corporation of Massachusetts
Original application Apr. 4, 1960, Ser. No. 19,714. Divided and this application July 12, 1963, Ser. No. 294,499
6 Claims. (Cl. 346—139)

This invention relates to indicating and recording instruments in which a pen arm, including a stylus, traces a line on a record sheet and, in particular, to an improved pen arm for such instruments and constitutes a division of my pending application for Indicating and Recording Control, Serial No. 19,714, filed April 4, 1960, in which the pen arm is fully disclosed.

The objects of the invention are to provide a pen arm which is of simple construction; which has a high degree of flexibility in a plane perpendicular to the record sheet, and is therefore sensitive to adjustment of its bearing pressure on the record sheet; which is rigid in a plane parallel to the recording sheet and hence accurate; which may readily be lifted away from the surface of the record sheet to permit replacing the stylus without disturbing its initial adjustment; which is of negligible weight and hence uneffected by inertia; and which is adjustable for a zero position.

As herein illustrated, the arm is pivotally supported for swinging movement across a record sheet about an axis perpendicular to its surface and comprises a long narrow blade of thin flexible sheet metal having, near its proximal end, a slot of inverted U-shape which defines a flexible central part at that end. The aforesaid part contains openings therein for attaching elements, by means of which the blade is pivotally supported for rotation about an axis perpendicular to the chart and flexible about an axis parallel to the chart. The edges of the blade, parallel to the legs of the U-shaped slot, are bent at right angles to the plane of the blades to constitute stiffening flanges at the proximal end. The distal end of the blade, forwardly of the central part, is flat, tapers to a blunt point, is flexible perpendicular to the plane of the record sheet, and has at its end a stylus perpendicular to the plane of its surface. A U-shaped frame supports the proximal end of the pen arm, comprising parallel arms having aligned openings for reception of a supporting shaft, one of the parallel arms having apertures for the reception of attaching elements whereby the central part of the blade is secured to the frame. The blade contains an arcuate slot through which one of the attaching elements on the frame arm pass and by means of which the blade may be adjusted relative to the frame arm to establish its zero position. A limb is fixed at one end to one of the other pair of frame arms and at its opposite end by a link to the proximal end of the instrument indicator for swinging of the frame and hence of the pen arm on the record sheet in consonance with the movement of the indicator.

The invention will now be described in greater detail with reference to the accompanying drawings wherein:

FIG. 1 is a front elevation of the instrument embodying the pen arm which forms the subject matter of this invention;

FIG. 2 is a right-hand side elevation of the chassis of the instrument showing the support for the pen arm;

FIG. 3 is a fragmentary side elevation on the left-hand side of the instrument showing the means for pivotally connecting the pen arm to the support;

FIG. 4 is a section taken on the line 4—4 of FIG. 1, to larger scale; and

FIG. 5 is a section taken on the line 5—5 of FIG. 1.

Referring to the drawings (FIG. 1), the instrument is of the type wherein an indicator 10 is supported for movement in response to changes of pressure or temperature parallel to a scale plate 12 on which is inscribed a scale 14. The indicator 10 is fixed for movement to a shaft 14 which projects forwardly from the front wall of the instrument casing c so that the indicator arm is spaced from and parallel thereto, and the wall of the casing contains a suitable recess within which there is supported a recording sheet R of the kind commonly employed in temperature records which may be removed and replaced after each use.

The movement of the indicator arm 10 is traced on the recording sheet R by a pen arm 18 which is supported, as will appear hereinafter, for swinging movement about a horizontal axis perpendicular to the front face of the instrument, parallel to the surface of the recording disc R, movement being effected in consonance with the indicator 10 by a link connecting the two.

The pen arm 18 is a substantially flat, long, narrow blade of flexible metal having a rear or proximal portion 18a, which is substantially rectangular and a forward or distal portion 18b which tapers from its junction with the rear portion, forwardly, to a relatively narrow blunt point to which a stylus is fixed. The rectangular rear portion 18a contains an inverted U-shaped slot, the legs of which are parallel to the side edges of the blade, which separates therefrom a central portion 18c, this latter portion providing the means by which the pen arm is supported and permits tilting of the arm about an axis parallel to the plane of the blade, passing through the extremities of the legs of the U-shaped slot. The parallel edges of the blades are bent back at right angles to the plane of the blade to provide spaced parallel stiffening flanges 18d—18d. The tapering forward portion of the blade is freely flexible perpendicular to its plane surface and hence to the record chart.

The support for the pen arm 18 (FIG. 2) comprises a forwardly directed post 20 secured at its rear end to the upper part of a plate 22 forming a part of the chassis of the instrument. This post has an axial bore 23 which receives the rear end portion of a fixed horizontal shaft 24 (FIG. 3), the latter being secured to the post 20 by a set screw 26. A U-shaped frame 28, comprising substantially parallel frame arms 30 and 32, is mounted to swing on the shaft 24. The forward arm 32 of this frame is provided with screw-threaded openings, one above and one below the axis of the shaft 24, which receives screws 34 passing loosely through holes in the central part 18c. As thus mounted, the pen arm is rotatable about the forwardly projecting axis of the shaft 24, parallel to the surface of the record chart and, by applying rearward pressure to the proximal end of the pen arm, that is, beyond the end of the U-shaped slot, the arm may be rocked about an axis passing through the lower ends of the U-shaped slot on an axis parallel to the plane of the blade thus raising the stylus at the distal end of the pen arm from its operative position in contact with the record chart to facilitate removal or replacement of the stylus. The arm 32 of the frame has another screw-threaded opening 44 at its lower end which receives an eccentric screw 46 which passes through an elongate slot 48 in the pen arm, this arrangement being such that the pen arm may be adjusted angularly with reference to the frame arm 32.

The U-shaped frame 28 has a limb arm 50 (FIG. 1) which is connected by a link 52 to a part 54 integral with the base or proximal end of the indicator arm 10 so that, as the indicator arm swings, the pen arm 18 swings likewise.

As thus constructed, the pen arm may be comprised of sheet metal, such as aluminum, so as to be of lightweight; is flexible perpendicular to the plane of its flat surface; is rigid at right angles to the plane of its surface by reason of the flanges so that it is accurate in movement; is adjustable relative to its support to enable setting it at a zero position; and may be easily lifted away from the recording chart without disturbing its adjustment or accuracy to permit replacing the recording chart when desired and/or to provide access to the stylus to keep the latter clean.

The pen arm herein illustrated, as previously mentioned, is disclosed in my pending application Serial No. 19,714, and reference may be had thereto for more specific details of the instrument itself if desired.

It should be understood that the present disclosure is for the purpose of illustration only and that this invention includes all modifications and equivalents which fall within the scope of the appended claims.

I claim:

1. A pen arm for a recording instrument provided with a recording chart comprising a long, flat, narrow blade adapted to be supported for pivotal movement about an axis perpendicular to its plane surface parallel to the recording chart, said blade having a rigid, substantially rectangular rear part having spaced parallel, right-angularly disposed flanges at its edges and a forepart tapering from its junction with the rear part to a blunt point, said rear part including a central part flexible along a line transverse to the blade and parallel to the plane of the blade, said flexible central part containing means for mounting the blade on a support for pivotal movement of the arm parallel to the plane of the record chart, and said flexible central part supporting the arm for tilting about said axis to lift the forepart away from the chart and said forepart being freely flexible throughout its length.

2. In a recording instrument of the class described, wherein a pivotally supported pen arm swings across a recording chart, said pen arm being of thin flexible sheet metal and having a slot of inverted U-shape in its upper portion which defines a central panel, said panel having openings therein for attaching elements, the margins of the pen arm adjacent to said slot being bent thereby to constitute stiffening flanges, and a U-shaped frame for supporting the pen arm, said frame comprising parallel arms having aligned openings for the reception of a supporting shaft, one of said arms having apertures for the reception of attaching elements whereby the panel portion of the pen arm is secured to the frame, and means for swinging the frame thereby to move the pen arm across the recording chart.

3. A recording instrument according to claim 2 wherein the pen arm has an arcuate slot located approximately midway its length, and an eccentric screw passing through said slot and into a threaded hole in the apertured arm of the frame whereby the pen arm may be adjusted angularly relatively to the center of the shaft on which the frame is mounted.

4. A pen arm comprising a relatively stiff, long, narrow blade having a butt end and a stylus-supporting end, a cantilever support intermediate the ends of the blade, said cantilever support being joined to the blade intermediate the ends and extending from its place of junction with the blade away from the stylus-supporting end toward the butt end, and means at the distal end of the cantilever support for securing it to a staff for rotation of the arm about an axis perpendicular thereto, said cantilever support at its junction with the blade affording a flexible hinge on which the blade is bendable by pressure applied to the butt end about an axis transverse to the blade to effect movement of the stylus end in an opposite direction.

5. A pen arm comprising a long, narrow blade having a relatively stiff part, a relatively flexible part extending from one end of the stiff part, a stylus fixed to the distal end of the flexible part, and a cantilever support joined at its proximal end to the stiff part adjacent the junction of the stiff part with the flexible part, said cantilever support extending away from said junction toward the distal end of the stiff part, and means at the distal end of the cantilever support for securing it to a staff for rotation of the arm about an axis perpendicular thereto, said cantilever support at its junction with the blade affording a flexible hinge on which the blade is bendable by pressure applied to the butt end about an axis transverse thereto to effect movement of the stylus in the opposite direction.

6. A pen arm comprising a long, narrow blade having a relatively stiff part, a relatively flexible part of narrower width extending from one end of the stiff part, a stylus fixed to the distal end of the flexible part, a cantilever situated in the stiff part with its proximal end integral with the stiff part adjacent the junction of the stiff part with the flexible part, said cantilever lying within the plane surfaces of the stiff part, means at the distal end of the cantilever for securing it to a staff for rotation of the arm about an axis perpendicular thereto, said cantilever at its junction with the blade affording a flexible hinge on which the blade is bendable by pressure applied to the distal end of the stiff part about an axis transverse to the blade to effect movement of the stylus end in the opposite direction.

References Cited in the file of this patent

UNITED STATES PATENTS

| | | |
|---|---|---|
| 1,136,648 | Bristol | Apr. 20, 1915 |
| 2,173,061 | Erbguth | Sept. 12, 1939 |
| 2,500,657 | Bowditch | Mar. 14, 1950 |